(12) United States Patent
Kozlov et al.

(10) Patent No.: US 8,137,561 B2
(45) Date of Patent: Mar. 20, 2012

(54) MEDIA FOR MEMBRANE ION EXCHANGE CHROMATOGRAPHY BASED ON POLYMERIC PRIMARY AMINES, SORPTION DEVICE CONTAINING THAT MEDIA, AND CHROMATOGRAPHY SCHEME AND PURIFICATION METHOD USING THE SAME

(75) Inventors: Mikhail Kozlov, Belmont, MA (US); Wilson Moya, Concord, MA (US); Michael W. Phillips, Tyngsborough, MA (US); Senthilkumar Ramaswamy, Nashua, NH (US); Brian Gagnon, Billerica, MA (US)

(73) Assignee: EMD Millipore Corporation, Billerica, MA (US)

( * ) Notice: Subject to any disclaimer, the term of this patent is extended or adjusted under 35 U.S.C. 154(b) by 0 days.

(21) Appl. No.: 13/167,297

(22) Filed: Jun. 23, 2011

(65) Prior Publication Data

US 2011/0288277 A1 Nov. 24, 2011

Related U.S. Application Data

(62) Division of application No. 12/221,496, filed on Aug. 4, 2008.

(60) Provisional application No. 60/964,653, filed on Aug. 14, 2007, provisional application No. 61/070,708, filed on Mar. 25, 2008.

(51) Int. Cl.
*B01D 15/08* (2006.01)
(52) U.S. Cl. ............... 210/635; 210/656; 210/198.2; 210/502.1
(58) Field of Classification Search ............ 210/635, 210/656, 659, 198.2, 502.1; 530/413, 416, 530/417
See application file for complete search history.

(56) References Cited

U.S. PATENT DOCUMENTS 3,527,712 A 9/1970 Renn et al.
4,274,985 A 6/1981 Szejtli et al.
(Continued)

FOREIGN PATENT DOCUMENTS

EP 0087786 A1 9/1983
(Continued)

OTHER PUBLICATIONS

International Search Report and Written Opinion mailed Aug. 5, 2011 in co-pending PCT patent application No. PCT/US11/35443.

(Continued)

*Primary Examiner* — Ernest G Therkorn
(74) *Attorney, Agent, or Firm* — Nields, Lemack & Frame, LLC (57) ABSTRACT

Media and devices, such as anion exchangers including such media, wherein the media is a membrane having a surface coated with a polymer such as a polyallylamine. The resulting membrane offers stronger binding of protein impurities and superior removal of host cell proteins from biological samples than conventional ligands based on quaternary ammonium salts, including trimethylammonium ligands. Also described is a chromatography scheme and method for purifying monoclonal antibodies, wherein the anion exchange sorber is placed downstream of an affinity column (such as Protein A or Protein G affinity column) and optionally one or more polishing devices such as cationic exchange columns. Little or no dilution of the cation exchanger pool (or affinity column exchange pool where no cation exchanger is used) is necessary to lower the conductivity of the sample. The sorber functions well to strongly bind host cell proteins and other impurities in biological samples even at high conductivities and pH.

7 Claims, 3 Drawing Sheets

U.S. PATENT DOCUMENTS

| | | | |
|---|---|---|---|
| 4,335,017 A | 6/1982 | Miles et al. | |
| 4,431,545 A | 2/1984 | Pall et al. | |
| 4,452,892 A | 6/1984 | Rosevear | |
| 4,618,533 A | 10/1986 | Steuck | |
| 4,659,474 A | 4/1987 | Perry et al. | |
| 4,675,104 A | 6/1987 | Rai et al. | |
| 4,743,373 A | 5/1988 | Rai et al. | |
| 4,861,705 A | 8/1989 | Margel | |
| 4,895,661 A | 1/1990 | Cadotte | |
| 4,944,879 A | 7/1990 | Steuck | |
| 5,009,759 A | 4/1991 | Serwer et al. | |
| 5,075,432 A | 12/1991 | Vanzo | |
| 5,137,633 A | 8/1992 | Wang | |
| 5,252,709 A | 10/1993 | Burnouf et al. | |
| 5,277,915 A | 1/1994 | Provonchee et al. | |
| 5,304,638 A | 4/1994 | Marshall et al. | |
| 5,328,603 A | 7/1994 | Velander et al. | |
| 5,492,723 A | 2/1996 | Sanderson et al. | |
| 5,522,994 A | 6/1996 | Frechet et al. | |
| 5,547,576 A | 8/1996 | Onishi et al. | |
| 5,672,416 A | 9/1997 | Radola et al. | |
| 5,814,372 A | 9/1998 | Moya | |
| 5,814,567 A | 9/1998 | Yahiaoui et al. | |
| 5,837,520 A | 11/1998 | Shabram et al. | |
| 5,895,575 A | 4/1999 | Kraus et al. | |
| 5,897,779 A | 4/1999 | Wisted et al. | |
| 5,945,175 A | 8/1999 | Yahiaoui et al. | |
| 6,008,036 A | 12/1999 | Fanget et al. | |
| 6,090,288 A | 7/2000 | Berglund et al. | |
| 6,562,573 B2 | 5/2003 | Halaka | |
| 6,602,697 B1 | 8/2003 | Cook, III | |
| 6,635,174 B1 | 10/2003 | Berg et al. | |
| 6,780,327 B1 | 8/2004 | Wu et al. | |
| 6,951,713 B2 | 10/2005 | Hei et al. | |
| 7,001,550 B2 | 2/2006 | Van Reis | |
| 7,073,671 B2 | 7/2006 | Charkoudian | |
| 7,094,347 B2 | 8/2006 | Wu et al. | |
| 7,160,464 B2 | 1/2007 | Lee et al. | |
| 7,479,222 B2 | 1/2009 | DiLeo et al. | |
| 7,824,548 B2 | 11/2010 | DiLeo et al. | |
| 2001/0043916 A1 | 11/2001 | McNeilly et al. | |
| 2002/0134729 A1 | 9/2002 | Muranaka et al. | |
| 2003/0121844 A1 | 7/2003 | Koo et al. | |
| 2003/0134100 A1 | 7/2003 | Mao et al. | |
| 2003/0155676 A1 | 8/2003 | Lubda et al. | |
| 2003/0201229 A1 | 10/2003 | Siwak et al. | |
| 2005/0103714 A1 | 5/2005 | Sabottke | |
| 2005/0142542 A1 | 6/2005 | Hei et al. | |
| 2005/0191426 A1 | 9/2005 | Moya | |
| 2005/0192249 A1 | 9/2005 | Moya et al. | |
| 2005/0211615 A1 | 9/2005 | DiLeo et al. | |
| 2005/0211616 A1 | 9/2005 | DiLeo et al. | |
| 2005/0211621 A1 | 9/2005 | Wu et al. | |
| 2005/0220982 A1 | 10/2005 | Moya et al. | |
| 2006/0194953 A1 | 8/2006 | Bonnerjea et al. | |
| 2007/0256970 A1 | 11/2007 | DiLeo et al. | |
| 2008/0014625 A1 | 1/2008 | Etzel | |
| 2009/0050566 A1* | 2/2009 | Kozlov et al. | 210/656 |
| 2009/0087346 A1 | 4/2009 | Luchini et al. | |
| 2009/0130738 A1* | 5/2009 | Kozlov | 435/239 |
| 2010/0200507 A1* | 8/2010 | Kozlov et al. | 210/656 |
| 2010/0323430 A1* | 12/2010 | Kozlov | 435/239 |
| 2011/0065900 A1 | 3/2011 | Johansson et al. | |
| 2011/0284446 A1 | 11/2011 | Kozlov et al. | |

FOREIGN PATENT DOCUMENTS

| | | |
|---|---|---|
| EP | 0197784 A1 | 10/1986 |
| EP | 0328256 A1 | 8/1989 |
| EP | 0474617 A1 | 3/1992 |
| EP | 0586268 A1 | 3/1994 |
| EP | 1468723 A1 | 10/2004 |
| EP | 1470854 A1 | 10/2004 |
| EP | 1614459 A1 | 1/2006 |
| EP | 2027921 A2 | 2/2009 |
| EP | 2060316 A1 | 5/2009 |
| GB | 2390042 B | 11/2006 |
| JP | 06-015167 A | 1/1994 |
| JP | 2002-010782 A | 1/2002 |
| JP | 2002-045176 A | 2/2002 |
| JP | 2002-537106 A | 11/2002 |
| JP | 2003-505243 A | 2/2003 |
| WO | 90/14886 A1 | 12/1990 |
| WO | 00/44928 A2 | 8/2000 |
| WO | 00/50160 A1 | 8/2000 |
| WO | 01/08792 A2 | 2/2001 |
| WO | 01/38228 A1 | 5/2001 |
| WO | 03/008078 A2 | 1/2003 |
| WO | 03/078592 A2 | 9/2003 |
| WO | 2005/077528 A2 | 8/2005 |
| WO | 2005/113604 A2 | 12/2005 |
| WO | 2008/008872 A2 | 1/2008 |
| WO | 2008/115653 A2 | 9/2008 |
| WO | 2009/145722 A1 | 12/2009 |

OTHER PUBLICATIONS

International Search Report and Written Opinion mailed Aug. 17, 2011 in co-pending PCT patent application No. PCT/US11/35444.

Introduction to Modern Liquid Chromatography, 1979, pp. 493-494, "Size-Exclusion Chromatography", Snyder.

Biotechol. Prog., 2003, 19, pp. 921-927, "Use of Ceramic Monoliths as Stationary Phase in Affinity Chromatography", del Valle, et al.

Chromotographic Science Series, 2002, 87 ( HPLC of Biological Macromolecules) , 2nd Edition, pp. 17-48, "Organic Polymer Support Materials", Svec.

Ind. Eng. Chem. Res. 1999, 38, pp. 865-872, "Rolled Stationary Phases: Dimensionally Structured Textile Adsorbents for Rapid Liquid Chromatography of Proteins", Hamaker, et al.

Journal of Solid-Phase Biochemistry, vol. 2, No. 1, 1977, pp. 45-78, "Immunochemical Characteristics and Preparative Application of Agarose-Based Immunosorbents", Eveleigh, et al.

Journal of Chromatography B, 722 (1999), pp. 71-88, "Surface Affinity Chromatography of Human Peripheral Blood Cells", Shibusawa.

Carbohydrate Research, 267(2), 1995, pp. 271-290, "Molecular Characterization of Polysaccharides Dissolved in Me2NAc-LiCL by Gel-Permeation Chromatography", Striegel, et al.

International Search Report and Written Opinion dated May 23, 2005 in co-pending foreign patent application No. PCT/US2005/003281.

Office Action dated Jun. 29, 2011 in corresponding U.S. Appl. No. 12/221,496.

Vox Sanguinis (2006) 90, pp. 97-104, "A modified caprylic acid method for manufacturing immunoglobulin G from human plasma with high yield and efficient virus clearance", Parkkinen, et al.

Biologicals xx (2007), pp. 1-7, "Partitioning and inactivation of viruses by the caprylic acid precipitation followed by a terminal pasteurization in the manufacturing process of horse immunoglobulins", Mpandi, et al.

Journal of Chromatography A, 1016 (2003), pp. 21-33, "Preparation and characterization of prototypes for multi-modal separation media aimed for capture of negatively charged biomolecules at high salt conditions", Johansson, et al.

Microfiltration and Ultrafiltration: Principles and Applications, 2006, "Chapter 3: Membrane Formation Technologies", pp. 122-179, Zeman, et al.

Journal of Chromatography A, 1078 (2005) pp. 74-82, "Performance of a membrane adsorber for trace impurity removal in biotechnology manufacturing", Phillips, et al.

Journal of Membrane Science 299 (2007) pp. 251-260, "Direct capture of influenza A virus from cell culture supernatant with Sartobind anion-exchange membrane adsorbers", Kalbfuss, et al.

Biotechnology and Bioengineering, vol. 96, No. 5, Apr. 1, 2007, pp. 932-944, "Purification of Cell Culture-Derived Human Influenza A Virus by Size-Exclusion and Anion-Exchange Chromatography", Kalbfuss, et al.

Biotechnology and Bioengineering, vol. 103, No. 5, Aug. 1, 2009, pp. 920-929, "Design of Salt-Tolerant Membrane Adsorbers for Viral Clearance", Riordan, et al.

Biopharm International, Oct. 2, 2009, 6 pages, http://license.icopyright.net/user/viewFreeUse.act?fuid=NTQ3MzkzNw%3D%3D, "Salt Tolerant Interaction Chromatography for Large-Scale Polishing with Convective Media", Faber, et al.

J.M.S.—Pure Appl. Chem., A36 (7&8), pp. 1085-1091, (1999), "Design and Characterization of Sevelamer Hydrochloride: A Novel Phosphate-Binding Pharmaceutical", Holmes-Farley, et al.

European Communication dated Oct. 12, 2010 in corresponding foreign patent application No. EP 08162316.7.

Partial European Search Report dated Jan. 26, 2011 in corresponding foreign patent application No. EP 08162316.7.

Japanese Communication dated Feb. 8, 2011 in corresponding foreign patent application No. JP 2008-209029.

Microfiltration and Ultrafiltration: Principles and Applications, 1996, pp. 122-179, Ch. 3, "Membrane Formation Technologies", Zeman, et al.

March's Advanced Organic Chemistry: Reactions, Mechanisms, and Structure, 5th Edition, 2001, Ch. 10, Aliphatic Nucleophilic Substitution, pp. 424-449, Smith, et al.

Virology, 1961, 13(2), pp. 264-267, "Separation of Adenovirus by Chromatography on DEAE-Cellulose", Haruna, et al.

Sigma, Sepharose-Based Ion Exchange Media, Product Information, Mar. 24, 1997, 4 pages.

Biotechnology/Innovations in Pharmaceutical Technology, "Capturing Large Biomolecules with Membrane Chromatography", Dec. 15, 2006, pp. 50-52, Sellick.

Proteins: Biochemistry and Biotechnology, (2002), "Protein Purification and Characterization/Membrane Chromatography", p. 152, Walsh.

http://en.wikipedia.org/w/index.php?title=Ultra-high-molecular-weight_polyethylene&oldid..., "Ultra-high-molecular-weight polyethylene", 1 page, Nov. 4, 2006 revision.

European Communication dated Jul. 20, 2009 in co-pending European Patent Application No. 08166546.5.

Japanese Communication, with English translation, dispatched Jul. 5, 2011 in co-pending Japanese patent application No. 2008-295590.

European Communication dated Oct. 13, 2011 in co-pending European patent application No. 11167550.0.

Final Rejection mailed Nov. 1, 2011 in corresponding U.S. Appl. No. 12/221,496.

Office Action mailed Oct. 26, 2010 in co-pending U.S. Appl. No. 12/284,815.

Office Action mailed Mar. 11, 2011 in co-pending U.S. Appl. No. 12/284,815.

Final Rejection mailed Oct. 25, 2011 in co-pending U.S. Appl. No. 12/284,815.

Office Action mailed Oct. 26, 2010 in co-pending U.S. Appl. No. 12/857,937.

Office Action mailed Mar. 10, 2011 in co-pending U.S. Appl. No. 12/857,937.

Final Rejection mailed Oct. 25, 2011 in co-pending U.S. Appl. No. 12/857,937.

* cited by examiner

MEDIA FOR MEMBRANE ION EXCHANGE CHROMATOGRAPHY BASED ON POLYMERIC PRIMARY AMINES, SORPTION DEVICE CONTAINING THAT MEDIA, AND CHROMATOGRAPHY SCHEME AND PURIFICATION METHOD USING THE SAME

This application is a divisional of U.S. patent application Ser. No. 12/221,496 filed Aug. 4, 2008, which claims priority of U.S. Provisional application Ser. No. 60/964,653 filed Aug. 14, 2007 and U.S. Provisional application Ser. No. 61/070,708 filed on Mar. 25, 2008, the disclosures of which are incorporated herein by reference.

BACKGROUND OF THE INVENTION

This invention relates to anion exchange chromatography media based on polymeric primary amines, an anion exchange sorber including that media, and a chromatography scheme including the sorber. Absorption refers to taking up of matter by permeation into the body of an absorptive material. Adsorption refers to movement of molecules from a bulk phase onto the surface of an adsorptive media. Sorption is a general term that includes both adsorption and absorption. Similarly, a sorptive material or sorption device herein denoted as a sorber, refers to a material or device that either ad- or absorbs or both ad- and absorbs. The media is particularly applicable as a porous membrane sorber used in a flow through cartridge and more particularly to a cartridge free of a separate exterior housing.

Strong anion exchangers, such as those based on quaternary ammonium ions, are used in downstream processing as a polishing media for capturing negatively charged large impurities, such as endotoxins, viruses, nucleic acids, and host cell proteins (HCP) that are present in fluids such as biological fluids, particularly solutions of manufactured biotherapeutics Traditionally, anion exchangers have been offered and used in the bead format, for example Q Sepharose® available from GE Healthcare Bio-Sciences AB. However, throughput limitations of bead-based systems require large volume columns to effectively capture impurities.

In bead-based chromatography, most of the available surface area for adsorption is internal to the bead. Consequently, the separation process is inherently slow since the rate of mass transport is typically controlled by pore diffusion. To minimize this diffusional resistance and concomitantly maximize dynamic binding capacity, small diameter beads can be employed. However, the use of small diameter beads comes at the price of increased column pressure drop. Consequently, the optimization of preparative chromatographic separations often involves a compromise between efficiency/dynamic capacity (small beads favored) and column pressure drop (large beads favored).

In contrast, membrane-based chromatographic systems (also called membrane sorbers), have the ligands attached directly to the convective membrane pores, thereby eliminating the effects of internal pore diffusion on mass transport. Additionally, the use of microporous membrane substrates with a tight membrane pore size distribution coupled with effective flow distributors can minimize axial dispersion and provide uniform utilization of all active sites. Consequently, mass transfer rates of membrane sorber media may be an order of magnitude greater than that of standard bead-based chromatography media, allowing for both high efficiency and high-flux separations. Since single or even stacked membranes are very thin compared to columns packed with bead-based media, reduced pressure drops are found along the chromatographic bed, thus allowing increased flow rates and productivities. The necessary binding capacity is reached by using membranes of sufficient internal surface area, yielding device configurations of very large diameter to height ratios (d/h).

Properly designed membrane sorbers have chromatographic efficiencies that are 10-100 times better than standard preparative bead-based resins. Consequently, to achieve the same level of separation on a membrane sorber, a bed height 10-fold less can be utilized. Bed lengths of 1-5 mm are standard for membrane sorbers, compared to bed heights of 10-30 cm for bead-based systems. Due to the extreme column aspect ratios required for large-volume membrane sorbers, device design is critical. To maintain the inherent performance advantages associated with membrane sorbers, proper inlet and outlet distributors are required to efficiently and effectively utilize the available membrane volume. Membrane sorber technology is ideally suited for this application. Current commercial membrane sorbers, however, suffer from various drawbacks, including low binding strength, difficulty in removing viruses, endotoxins and nucleic acids.

A membrane sorber is a highly porous, interconnected media that has the ability to remove (ad- and/or absorb) some components of a solution when the latter flows through its pores. The properties of the membrane sorber and its ability to perform well in the required application depend on the porous structure of the media (skeleton) as well as on the nature of the surface that is exposed to the solution. Typically, the porous media is formed first, from a polymer that does not dissolve or swell in water and possesses acceptable mechanical properties. The porous media is preferably a porous membrane sheet made by phase separation methods well known in the art. See, for example, Zeman L J, Zydney A L, *Microfiltration and Ultrafiltration: Principles and Applications*, New York: Marcel Dekker, 1996. Hollow fiber and tubular membranes are also acceptable skeletons. A separate processing step is usually required to modify the external or facial surfaces and the internal pore surfaces of the formed porous structure to impart the necessary adsorptive properties. Since the membrane structure is often formed from a hydrophobic polymer, another purpose of the surface modification step is also to make the surfaces hydrophilic, or water-wettable.

There exist a number of approaches to modify the external or facial surfaces and the internal pore surfaces of a membrane. Those skilled in the art will readily recognize exemplary methods involving adsorption, plasma oxidation, in-situ free-radical polymerization, grafting and coating. The majority of these methods lead to formation of monolayer-like structures on the membrane surface, which most of the time achieve the goal of making it hydrophilic, yet fail to impart acceptable adsorptive properties, for example high capacity for the adsorbate. The capacity is defined as the amount (weight) of the adsorbate that can be retained by a given volume of the media. As long as all adsorption occurs on the membrane surface, the capacity will be limited by the membrane surface area. By their nature, microporous membranes have lower surface area compared to chromatography beads. One way to increase surface area is to reduce pore size, which obviously leads to significant losses in flux. For example, the maximum (monolayer) adsorption of protein on a 0.65 um polyethylene membrane (Entegris Corp, Billerica Mass.) is about 20 mg/ml, regardless of the type of surface interactions. This is significantly less than, for example, agarose chromatography beads, with typical capacity about 80 mg/ml.

The type of surface interactions driving the adsorption is defined by the specific application in which a given membrane sorber product is used. Currently, there is a need for a high-capacity, high-affinity sorber that removes viruses, nucleic acids, endotoxins, and host cell proteins (HCPs) from a solution of monoclonal antibodies (MABs). These impurities tend to have a lower isoelectric point than the MABs, which means that at a certain pH they will be negatively charged while the MAB will be positively charged. An anion exchanger, i.e. a media that bears a positive charge and attracts anions, is required to remove these impurities. A number of chemical moieties bear a positive charge in an aqueous solution, including primary, secondary, and tertiary amines, as well as quaternary ammonium salts. The amines are positively charged at pH below 11, while the ammonium salts bear the positive charge at all pH, so these groups are commonly called weak and strong anion exchangers, respectively.

Anion exchange membranes have multiple positively charged binding sites that attract and hold various impurities and contaminants. The amount of impurities that can be potentially removed is a function of the concentration of these binding sites on the membrane, and the chemical nature of the ligand (as well as the concentration of these ligands) is responsible for the strength of binding for the various impurities. High strength of binding is a key attribute for increasing the removal of impurities, for example, host cell proteins. Strength of binding (SB) is related to the ionic strength of solutions required to elute the bound impurities. SB of membrane sorber (measured in conductivity units, mS/cm) is determined as follows. First, a small amount of adsorbate solution is passed through the membrane sorber so the adsorbate binds to the membrane sorber. Second, the membrane sorber is eluted with increasing gradient of inorganic salt, such as sodium chloride. The minimum conductivity of elution solution required to elute off the adsorbate is recorded and defined as the SB of that membrane sorber. By increasing the sorber strength of binding, negatively charged impurities can be made to bind irreversibly to the membrane sorber, thereby significantly increasing the removal efficiency. This is particularly important for the removal of weakly bound populations of host cell proteins from an antibody stream.

Conventional flow-through anion exchangers typically contain a quaternary ammonium ligand that is responsible for attracting and binding negatively charged impurities, while repelling the positively charged product molecules. Conventional wisdom dictates that in order to bind impurities strongly by charge interaction, a strong anion exchanger, i.e., one that has a positive charge at all pH values, is necessary. The present invention demonstrates otherwise. The present inventors found that polymeric primary amines, preferably aliphatic polymers having a primary amine covalently attached to the polymer backbone, more preferably having a primary amine covalently attached to the polymer backbone by at least one aliphatic group, preferably a methylene group, bind negatively charged impurities exceptionally strongly and thus are the preferred class of materials for creating the adsorptive hydrogel on the surface of a membrane sorber.

Monoclonal antibodies continue to gain importance as therapeutic and diagnostic agents. The process of screening hybridoma libraries for candidate mABs is both time consuming and labor intensive. Once a hybridoma cell line expressing a suitable mAB is established, a purification methodology must be developed to produce sufficient mAB for further characterization. A traditional method for purifying involves using Protein A or Protein G affinity chromatography. The purified antibody is desalted and exchanged into a biological buffer using dialysis. The entire process typically requires several days to complete and can be particularly onerous if multiple mABs are to be evaluated in parallel.

U.S. Pat. No. 6,090,288 teaches preparation of amino group containing chromatography media for separation of peptides and nucleic acids. It is disclosed that a higher ionic strength is necessary for elution of proteins from weak anion exchange ligands vs. strong ones. The important structural feature of the separation media disclosed is that "at a distance of 2 or 3 atoms away from an amino nitrogen there is a hydroxyl group or a primary, secondary or tertiary amino group". Herein, for example, we show that a loosely crosslinked coating of pure polyallylamine polymer does not require any additional groups to promote higher strength of binding of proteins.

U.S. Pat. No. 5,304,638 teaches using a protein separation medium that comprises a water-insoluble matrix carrying a plurality of polyamine groupings. One of the examples demonstrates preparing a polyallylamine surface modified agarose chromatography gel. However, the inventors of U.S. Pat. No. 5,304,638 fail to recognize the importance of using a primary amines vs. secondary and tertiary amines. No effort is made or described concerning controlling coating thickness to optimize sorption, or to crosslink the coating for stability. They emphasize the preferred number of carbon atoms between pairs of nitrogen atoms as being not more than 3. They introduce an empirical function Q, which is calculated based on the structure of polyamine grouping and pH and has a preferred value of at least 1.5. In polyallylamine, there are 5 carbon atoms between nearest nitrogen atoms, and the Q function for it would be close to 0.1.

U.S. Pat. No. 5,547,576 teaches preparing a porous membrane that has an immobilized polyamine coating and could be used to remove viruses from aqueous solution. The coating preparation involves first grafting a radical on the surface of the membrane and then reacting the radical with a polyamine compound. Grafting modifications are often impractical due to their inherent complexity: they are sensitive to the particular substrate a radical is grafted to, and can be expensive to implement in manufacturing environment. This method also suffers from the structural deficiencies discussed re: U.S. Pat. No. 5,304,638

All three of these patents, U.S. Pat. Nos. 6,090,288, 5,304,638, and 5,547,576, fail to recognize the importance of control over the thickness of polyamine coating or the degree of polymer cross-linking within that coating. All of them rely on chemical reaction of an amine-containing compound with a reactive group that has been covalently immobilized on the surface, either by grafting or direct reaction. In the end of any such procedure, one is essentially limited to a monolayer-type amine-containing coating. High sorptive capacity of these membranes can only be achieved by increasing the surface area, as is the case with agarose chromatography beads. The present invention teaches that high sorptive capacity is achieved by building a relatively thick layer of loosely cross-linked polymeric layer on the membrane surface, a radically different approach from all those taught in the prior art.

Accordingly, it would be desirable to provide media and a flow-through anion exchanger including such media, that offer strong binding of impurities and that do not suffer from the shortcomings of the prior art. Such an exchanger is particularly useful in the purification of monoclonal antibodies from cell culture media using a chromatography scheme, when placed downstream of an affinity chromatography column that is optionally followed by one or more polishing steps carried out with a cation exchange column, for example.

SUMMARY OF THE INVENTION

The problems of the prior art have been overcome by the present invention, which provides media and devices, such as anion exchangers including such media, wherein the media is a membrane having a surface coated with a polymer such as a polyallylamine. The resulting membrane surprisingly offers stronger binding of protein impurities and superior removal of host cell proteins from biological samples than conventional ligands based on quaternary ammonium salts, including trimethylammonium ligands.

Described is a method to significantly increase the sorptive capacity of microporous membranes. Instead of modifying the surface of the membrane in a monolayer-like fashion, the entire external and internal pore surfaces are coated with a loosely cross-linked hydrogel. The wet (swollen) thickness of this hydrogel is about 50-100 nm, which is sufficient to accommodate several layers of protein molecules. Thus, the adsorptive capacity of a microporous membrane is boosted from about 20 mg/ml to 80-100 mg/ml. The type of interactions driving the adsorption is defined by the specific application in which a given membrane sorber product is used. Currently, there is a need for a high-capacity, high-affinity sorber that removes viruses, nucleic acids, endotoxins, and host cell proteins (HCPs) from biological samples such as solutions of monoclonal antibodies (MABs). A number of chemical moieties bear a positive charge in an aqueous solution, including primary, secondary, and tertiary amines, as well as quaternary ammonium salts. The amines are positively charged at pH below 11, while the ammonium salts bear the positive charge at all pH, so these groups are called weak and strong anion exchangers, respectively. The present inventors discovered that polymeric primary amines, preferably aliphatic polymers having a primary amine covalently attached to the polymer backbone, more preferably having a primary amine covalently attached to the polymer backbone by at least one aliphatic group, preferably a methylene group, bind negatively charged impurities exceptionally strongly and thus are the preferred class of materials for creating the adsorptive hydrogel on the surface of a membrane sorber.

Also described is a chromatography scheme and method for purifying monoclonal antibodies, wherein the anion exchange sorber is placed downstream of an affinity column (such as Protein A or Protein G affinity column) and optionally one or more polishing devices such as cationic exchange columns, or just a cation exchange column. In view of the nature of the media in the anion exchange sorber described, little or no dilution of the cation exchanger pool (or affinity column exchange pool where no cation exchanger is used) is necessary to lower the conductivity of the sample because the present sorber media can operate at higher ionic strengths. The sorber functions well to strongly bind host cell proteins and other negatively charged impurities in biological samples even at conductivities approaching 15 mS/cm, and at relatively high pH.

As discussed earlier, relatively high device permeability is achieved without sacrificing binding capacity because of the convective flow of the membrane sorber compared to the diffusive flow of bead-based sorbers.

DETAILED DESCRIPTION OF SPECIFIC EMBODIMENTS

The present invention relates to a porous chromatographic or sorptive media having a porous, polymeric coating formed on a porous, self-supporting substrate, to anionic exchangers including such media, to purification schemes including the sorber, and to methods of purification. The media is particularly suited for the robust removal of low-level impurities from manufactured biotherapeutics, such as monoclonal antibodies, in manner that integrates well into existing downstream purification processes. Typical impurities include DNA, endotoxin, HCP and viruses. The media functions well at high salt concentration and high conductivity (high affinity), effectively removing viruses even under such conditions. High binding capacity without sacrificing device permeability is achieved. Indeed, depending on the coating properties produced by the methods described herein, nucleic acid binding capacities of greater than about 5 mg/ml, or greater than about 25 mg/ml, or greater than about 35-40 mg/ml, may be achieved. The amount of the anion exchange sorber is much less than that for a comparable bead-based process, since large dilutions of the sample being loaded on the sorber media are no longer necessary.

The porous substrate has two surfaces associated with the geometric or physical structure of the substrate. A sheet will have a top and bottom surface, or a first and a second surface. These are commonly termed "sides." In use, fluid will flow from one side (surface) through the substrate to and through the other side (surface). For hollow fibers and tubular membranes, there is an inside and an outside surface. Flow proceeds from the inside to the outside, or vice versa, depending on design and use.

The thickness dimension between the two surfaces is porous. This porous region has a surface area associated with the pores. In order to prevent confusion related to the terms "surface", "surfaces", or "surface area," or similar usages, the inventors will refer to the geometric surfaces as external or facial surfaces or as sides. The surface area associated with the pores will be referred to as internal or porous surface area.

Porous material comprises the pores, which are empty space, and the solid matrix or skeleton which makes up the physical embodiment of the material. For example, in a nonwoven web, the randomly oriented fibers make up the matrix and give the web its form. In polymer microporous membranes, the phase separated polymer provides the matrix. Herein, the inventors discuss coating or covering the surface of the media. The inventors mean by this that the internal and external surfaces are coated so as to not completely block the pores, that is, to retain a significant proportion of the structure for convective flow. In particular, for the internal surface area, coating or covering means that the matrix is coated or covered, leaving a significant proportion of the pores open.

Absorption refers to taking up of matter by permeation into the body of an absorptive material. Adsorption refers to movement of molecules from a bulk phase onto the surface of an adsorptive media. Sorption is a general term that includes both adsorption and absorption. Similarly, a sorptive material or sorption device herein denoted as a sorber, refers to a material or device that both ad- and absorbs.

The porous substrate acts as a supporting skeleton for the adsorptive hydrogel. The substrate should be amenable to handling and manufacturing into a robust and integral device. The pore structure should provide for uniform flow distribution, high flux, and high surface area. The substrate may be a fiber, a sheet such as a woven fabric, a non-woven, a mat, a felt or a membrane. Preferably, the substrate is a sheet formed of a woven or non-woven fabric or a membrane.

Fibers may be of any length, diameter and may be hollow or solid. They are not bonded together as a substrate (although they may be formed into an unitary structure after application of the coating) but are individual discrete entities. They may be in the form of a continuous length such as thread or monofilament of indeterminate length or they may be formed into shorter individual fibers made by chopping fibrous materials such as non-woven or woven fabrics, cutting the continuous length fiber into individual pieces, formed by a crystalline growth method and the like.

Non-woven fabrics are flat, porous sheets made directly from separate fibers bonded together by entangling fiber or filaments, thermally or chemically. Typically, nonwoven fabric manufacturers supply media having from 1 to 500 micron mean flow pore (MFP) ratings. For non-woven fabrics, the porous structure is the entangled fibers, and porosity refers to the tortuous spaces between and among the fibers. Porosity has a similar meaning for felted fabrics. A preferred non-woven is by Freudenberg Nonwovens NA of Lowell, Mass. and is type FO2463.

Woven fabrics are produced by the interlacing of warp fibers and weft fibers in a regular pattern or weave style that is at some predefined angle to each other. Typically the weft is at an angle of about 90 degrees to that of the warp. Other commonly used angles include but are not limited to 30, 45, 60 and 75 degrees. The fabric's integrity is maintained by the mechanical interlocking of the fibers cause by the weaving process. Drape (the ability of a fabric to conform to a complex surface), surface smoothness and stability of a fabric are controlled primarily by the weave style, such as plain, twill, satin, basket weave, leno, etc. In this case, the substrate porosity is the space between the fibers and is of a less tortuous nature.

The substrate also may be formed from a variety of materials including glass, plastics, ceramics and metals.

Borosilicate glass is one example of a suitable glass. It can be formed as fibers or glass mats.

Various ceramics based on the more conventional silicate chemistries or more exotic chemistries such as yttrium, zirconia, titanium and the like and blends thereof can be used. They can be formed into fibers, mats, felts, monoliths or membranes.

Metals such as stainless steel, nickel, copper, iron or other magnetic metals and alloys, palladium, tungsten, platinum, and the like maybe made into various forms including fibers, sintered sheets and structures, such as sintered stainless steel or nickel filters, woven screens and non-woven mats, fabrics and felts such as stainless steel wool.

The preferred substrate is made from synthetic or natural polymeric materials. Thermoplastics are a useful class of polymers for this use. Thermoplastics include but are not limited to polyolefins such as polyethylenes, including ultra-high molecular weight polyethylenes, polypropylenes, sheathed polyethylene/polypropylene fibers, PVDF, polysulfone, polyethersulfones, polyarylsulphones, polyphenylsulfones, polyvinyl chlorides, polyesters such as polyethylene terephthalate, polybutylene terephthalate and the like, polyamides, acrylates such as polymethylmethacrylate, styrenic polymers and mixtures of the above. Other synthetic materials include celluloses, epoxies, urethanes and the like.

Suitable substrates include microporous filtration membranes, i.e. those with pore sizes from about 0.1 to about 10 µm. Substrate material can be hydrophilic or hydrophobic. Examples of hydrophilic substrate materials include, but are not limited to, polysaccharides and polyamides, as well as surface treated hydrophilic porous membranes, such as Durapore® (Millipore Corporation, Billerica Mass.). Examples of hydrophobic material include, but are not limited to, polyolefins, polyvinylidene fluoride, polytetafluoroethylene, polysulfones, polycarbonates, polyesters, polyacrylates, and polymethacrylates. The porous structure is created from the substrate material by any method known to those skilled in the art, such as solution phase inversion, temperature-induced phase separation, air casting, track-etching, stretching, sintering, laser drilling, etc. Because of the universal nature of the present invention, virtually any available method to create a porous structure is suitable for making the supporting skeleton for the membrane sorber. A substrate material made from ultra-high molecular weight polyethylene has been found to be useful due to its combination of mechanical properties, chemical, caustic and gamma stability.

The coating polymer forms the adsorptive hydrogel and bears the chemical groups (binding groups) responsible for attracting and holding the impurities. Alternatively, the coating polymer possesses chemical groups that are easily modifiable to incorporate the binding groups. The coating is permeable to biomolecules so that proteins and other impurities can be captured into the depth of the coating, increasing adsorptive capacity. The preferred coating polymer is a polymeric primary amine. Examples of suitable polymeric primary amines include polyallylamine, polyvinylamine, polybutylamine, polylysine, their copolymers with one another and with other polymers, as well as their respective protonated forms. A coating made from polyallylamine (and/or its protonated form, for example polyallylamine hydrochloride (PAH)) has been found to be particularly useful. PAA is commercially available (Nitto Boseki) in a number of molecular weights, usually in the range from 1,000 to 150,000, and all these can be used for creating a membrane sorber. PAA and PAH are readily soluble in water. The pH of aqueous solution of PAA is about 10-12, while that of PAH is 3-5. PAA and PAH may be used interchangeably, however the pH of the final solution must be monitored and if necessary adjusted to the value above 10 so that non-protonated amino groups are available for reaction with a cross-linker.

The coating typically constitutes at least about 3% of the total volume of the coated substrate, preferably from about 5% to about 10%, of the total volume of the substrate. In certain embodiments, the coating covers the substrate in a substantially uniform thickness. Suitable thicknesses range of dry coating from about 10 nm to about 50 nm.

A cross-linker reacts with the polymer to make the latter insoluble in water and thus held on the surface of the supporting skeleton. Suitable cross-linkers are difunctional or polyfunctional molecules that react with the coating polymer and are soluble in the chosen solvent, which is preferably water. A wide variety of chemical moieties react with primary amines, most notably epoxides, chloro-, bromo-, and iodoalkanes, carboxylic acid anhydrides and halides, aldehydes, α,β-unsaturated esters, nitriles, amides, and ketones. A preferred cross-linker is polyethylene glycol diglycidyl ether (PEG-DGE). It is readily soluble in water, provides fast and efficient cross-linking, and is hydrophilic, neutral, non-toxic and readily available. The amount of cross-linker used in the coating solution is based on the molar ratio of reactive groups on the polymer and on the cross-linker. The preferred ratio is in the range from about 10 to about 1,000, more preferred from about 20 to about 200, most preferred from about 30 to about 100. More cross-linker will hinder the ability of the hydrogel to swell and will thus reduce the sorptive capacity, while less cross-linker may result in incomplete cross-linking, i.e. leave some polymer molecules fully soluble.

A surfactant may be used to help spread the polymer solution uniformly on the entire surface of the supporting structure. Preferred surfactants are non-ionic, water-soluble, and alkaline stable. Fluorosurfactants possess a remarkable ability to lower water surface tension. These surfactants are sold under the trade name Zonyl by E.I. du Pont de Nemours and Company and are particularly suitable, such as Zonyl FSN and Zonyl FSH. Another acceptable class of surfactants are octylphenol ethoxylates, sold under the trade name Triton X by The Dow Chemical Company. Those skilled in the art will appreciate that other surfactants also may be used. The concentration of surfactant used in the coating solution is usually the minimum amount needed to lower the solution surface tension to avoid dewetting. Dewetting is defined as spontaneous beading up of liquid on the surface after initial spreading. Dewetting is a highly undesirable event during formation of the membrane sorber, since it leads to non-uniform coating and exposure of the substrate, which sometimes results in non-wettable product and reduced sorptive capacity. The amount of surfactant needed can be conveniently determined by measuring contact angles that a drop of solution makes with a flat surface made from the same material as the porous skeleton. Dynamic advancing and receding contact angles are especially informative, which are measured as the liquid is added to or withdrawn from the drop of solution, respectively. Dewetting can be avoided if the solution is formulated to have the receding contact angle of 0°.

A small amount of a hydrophilic polymer that readily adsorbs on a hydrophobic surface optionally may be added to the solution as a spreading aid. Polyvinyl alcohol is the preferred polymer and can be used in concentrations ranging from about 0.05 wt. % to about 5 wt. % of total solution volume.

When the supporting porous structure cannot be readily wetted with the solution of polymer, such as in the case of hydrophobic microporous membrane, a wetting aid can be added to the solution. The wetting aid can be any organic solvent compatible with the coating polymer solution that does not negatively affect the cross-linking reaction. Typically the solvent is one of the lower aliphatic alcohols, but acetone, tetrahydrofuran, acetonitrile and other water-miscible solvents can be used as well. The amount of the added organic solvent is the minimum needed to effect instant wettability of the porous substrate with the coating solution. Exemplary wetting aids include methyl alcohol, ethyl alcohol, and isopropyl alcohol.

Methods of coating can improve the wetting of the web by the coating solution. The coating solution may be forced into the web in a controlled manner so as to uniformly saturate the web and leave no hydrophobic spots or areas. This may be done, for example by extruding the solution through a slot pressed against the web, or in close proximity to the web, in order to force the solution by the applied pressure of extrusion into the web. Persons skilled in the art will be able to determine conditions of pressure, speed and slot geometry needed to produce a uniform coating.

A preferred process for forming the coated substrate comprises the steps of: 1) preparing the solution; 2) applying the solution on the membrane; removing excess liquid from the external surfaces of the substrate 3) drying the membrane; 4) curing the membrane; 5) rinsing and drying of the membrane; 6) optional annealing of the finished membrane; and 7) optional acid treatment of the membrane. More specifically, a solution is prepared that contains a suitable polymer and cross-linker. The concentrations of these two components determine the thickness and degree of swelling of the deposited coating, which in turn define flux through the membrane and its sorptive capacity, as shown below. The polymer and cross-linker are dissolved in a suitable solvent, preferably water. The solution may optionally contain other ingredients, such as wetting aids, spreading aids, and a pH adjuster. If a hydrophobic substrate is used, the surface tension of solution will have to be low enough in order to wet it. Aqueous solutions of polymers typically will not wet hydrophobic microporous membranes, so an organic solvent (wetting aid) will have to be added to the solution. To help spread the coating uniformly on the surface of a hydrophobic membrane, a surfactant may be added to the solution. Finally, depending on the chemical nature of the cross-linker, the pH may need to be raised in order to effect the cross-linking reaction.

The solution components and typical concentration ranges are listed in Table 1:

TABLE 1

| Component | Role | Range, wt. % |
| --- | --- | --- |
| Polymeric primary amine | Hydrogel-forming adsorptive polymer | 3-15 |
| Cross-linker | Effects formation of hydrogel | 0.01-2.0 |
| Surfactant | Surfactant for even coating | 0-3.0 |
| Hydrophilic polymer | Surface hydrophilization | 0-1.0% |
| Organic solvent | Initial wetting of hydrophobic membrane with coating solution | 0-30 |
| Inorganic base | Raise pH to effect cross-linking | 0-5.0 |
| Water | Solvent | Balance |

The coating solution is applied on the substrate such as by submerging the substrate into solution, removing the substrate from solution, and removing excess of solution from both sides of the substrate mechanically, for example, using a pair of nip rolls (Nipped off). The porous substrate whose pores are filled with solution is subsequently dried. Drying can be carried out by evaporation at room temperature or can be accelerated by applying heat (Temperature range of about 40-110° C.). After the coated substrate is dried, it is held for a period of from several hours to several days so that cross-linker can fully react with the polymer. Cross-linking may be optionally accelerated by applying heat. The substrate is subsequently rinsed with copious amounts of solvent and dried again. Additional optional process steps include annealing the dried membrane sorber at an elevated temperature (60-120° C.) to adjust its flow properties and treating it with a strong non-oxidizing monobasic acid at concentration 0.1M to 1M to protonate the amino groups present in the coating.

Where the polymer is PAA, converting essentially all amino groups in the polymer into corresponding ammonium salts after heat treatment of the membrane will help ensure consistency of the product. Good water wettability is important. Since the base material is very hydrophobic and the hydrophilic coating is very loosely cross-linked and not covalently attached to the matrix, some lateral shrinking of the PAA gel will cause the membrane to become not wettable with water. On the other hand, if essentially all amino groups of the PAA are converted into corresponding ammonium salts, the increased volume of the dried coating, greater retention of water by counter-ions and stronger affinity for water of the charged polymer will help to make the membrane more water-wettable. A strong, non-toxic, non-oxidizing acid, preferably one that is monobasic to avoid ionic cross-linking of PAA, should be used to protonate PAA for this purpose. Suitable acids include hydrochloric, hydrobromic, sulfamic, methansulfonic, trichloroacetic, and trifluoroacetic acid. Although chloride may be the counter-ion of choice since it is already present in the sample protein solution, it may not be practical for a continuous process to use hydrochloric acid and/or its salt due to the corrosion of steel and the occupational safety issues involved. A more suitable acid is thus sulfamic acid ($H_2N\text{—}SO_2OH$) is preferred as the protonating agent for PAA.

A suitable process for protonating the PAA is to submerge the membrane in a 0.1-0.5 M solution of the protonating acid, preferably sulfamic acid in water (or a water/alcohol mix to fully penetrate a poorly wetting membrane), followed by rinsing and drying. The resulting membrane will bear sulfamate counter-ions, which may be easily exchanged out by employing a simple conditioning protocol, such as 0.5M sodium hydroxide followed by 0.5M sodium chloride.

Such acid treatment improves shelf life stability of the membrane, and also results in a significantly higher strength of binding. Although the present inventors should not be limited to any particular theory, it is believed that when PAA is dried in the fully protonated (acid-treated) state, it assumes a more extended, "open" morphology that is capable of better encapsulating BSA and thus will not release it until a higher ionic strength is reached. A further benefit of acid-treated membranes is greater stability towards ionizing irradiation, such as gamma irradiation, which is an accepted sterilization procedure for filtration products.

Three critical parameters define a successful membrane sorber product. They are: sorptive capacity, flux, and strength of binding. While the strength of binding is to a large extent determined by the chemical nature of groups presented on the surface of membrane sorber, capacity and flux are usually a lot more sensitive to the procedure employed to form the sorptive layer and the amount of polymer and cross-linker. It is often observed that for a given combination of supporting skeleton, purification efficiency (determined by the bed height) and chemical nature of the membrane sorber, greater flux can translate into smaller sorptive capacity, and vice versa.

Figure 1:
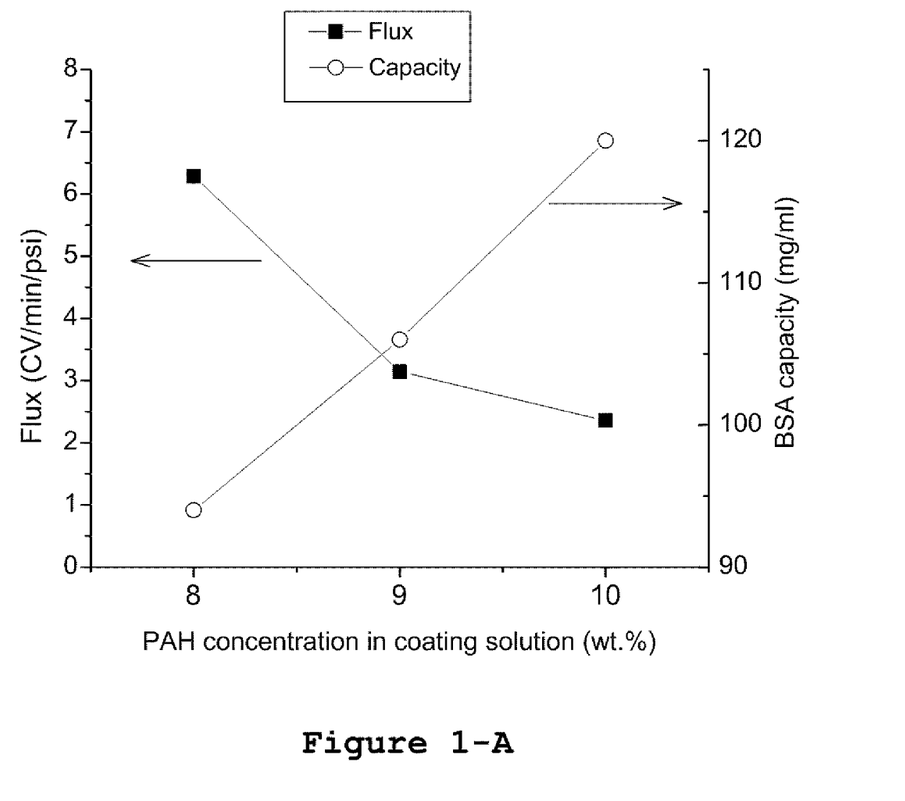
FIG. 1A is a graph of water flux and BSA capacity of 1 mm membrane sorber columns prepared from PAH cross-linked with 0.5% PEG-DGE.
FIG. 1B is a graph of water flux and BSA capacity of 1 mm membrane sorber columns prepared from with 9 wt. % PAH cross-linked with PEG-DGE.

FIGS. 1A and 1B show typical trends observed for a membrane sorber prepared according to the present invention. From these graphs, the trade-off between flux and capacity is obvious. It is seen that both PAH and cross-linker have a direct impact on these critical properties of the membrane sorber. To perform satisfactorily in the application, a good membrane sorber should possess both high flux and high capacity. Flux of a membrane sorber can be generally expressed in chromatographic units, CV/min/psi, where CV is Column Volume. The flux of a given column volume obviously depends on the column height, which is usually optimized for efficient separation. In case of an anion-exchange membrane sorber, efficient column height can be defined by the minimum height required to effect 99.99% removal (LRV 4.0) of a negatively charged virus, for example MMV. This column height was found to be about 0.5 mm for the membrane sorber in the present invention. For added assurance of virus clearance, columns of double that height (1 mm) are used routinely throughout this invention. A desirable flux of a membrane sorber with such column height would be at least 2.0 CV/min/psi or better, more preferably 2.5 CV/min/psi or better. Achieving the right combination of flux and capacity is exceptionally difficult. The present inventors have had to go significantly beyond routine experimentation or concentration optimization to achieve the outstanding properties of the membrane sorber. For example, the cross-linker was judiciously chosen to be a highly flexible, polymeric molecule that proven very beneficial for high sorptive capacity. Using intermediate molecular weight of PAA (15,000) has allowed achieving a balance between flow and capacity. The inorganic base used to adjust pH was of non-salting-out kind so that a higher concentration of PAA could be used to achieve high capacity. The choice of surfactant was dictated by recognizing the need for a non-ionic, caustic-stable compound, while the amount of surfactant needed was found in a separate investigation. For contrast, a PAA membrane sorber prepared in accordance with pending application US 2005/0211615 has flux of just 0.5 CV/min/psi for 1 mm column, while the BSA capacity is only about 61 mg/ml.

Another important aspect of this invention is the post-treatment procedure employed after the sorber membrane is cured, rinsed, and dried. The inventors discovered that treatment of membrane sorber based on polymeric primary amines with acid significantly boosts its strength of binding, wettability, and stability towards ionizing radiation.

A very surprising discovery made by the inventors was that acid treatment significantly increases the strength of binding of membrane sorber, from about 54-58 mS/cm to 78-82 mS/cm. It could be hypothesized that when PAA is dried in the fully protonated (acid-treated) state, it assumes a more extended, "open" morphology that is capable of better encapsulating BSA and thus will not release it until a higher ionic strength is reached. This benefit was unintended and surprising, yet it is very beneficial since a higher SB usually translates into better removal of trace impurities.

The permeability of the cross-linked PAA membrane adsorber was improved by a high-temperature "curing" process. The lightly cross-linked PAA-gel has the ability to absorb significant amount water resulting in orders of magnitude increase in its volume. This effect can cause low permeability. It appears that this property of the gel is reduced by dehydrating it to such an extent that it reduces the swelling to an acceptable level, without compromising the strength of binding and capacity of the gel. In fact, the curing process is capable of tuning the permeability of the membrane as necessary for the product. Suitable curing temperatures are about 25-120° C., more preferably from about 85-100° C.; and for about 6 to 72 hours.

Figure 2:
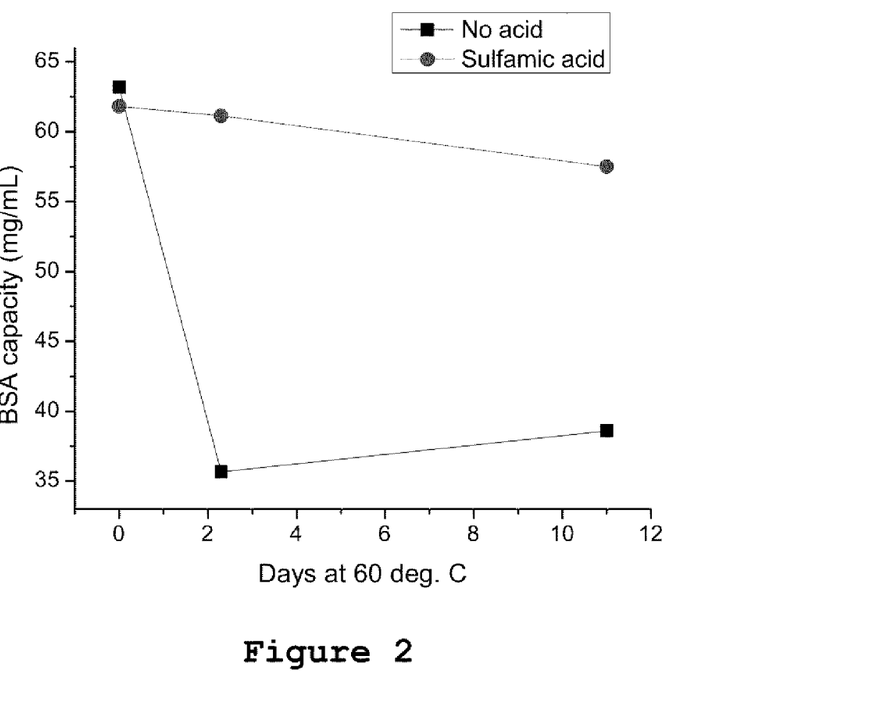
FIG. 2 is a graph of BSA capacity of a membrane sorber in the free base form and the sulfamate ion form in the accelerated shelf life test.

Gamma irradiation is a widely accepted sterilization procedure for filtration products. Gamma-sterilizability is a desirable feature of a membrane sorber. The inventors observed a surprising benefit of acid-treated membrane sorber in the fact that it had a greater stability towards ionizing irradiation. FIG. 2 demonstrates BSA capacity of membrane sorber samples (control, not treated with acid) and those converted into ammonium sulfamates. All of these samples were irradiated with 25 kGy of electron beam to simulate gamma sterilization conditions. It is clear that acid-treated samples maintain their properties much better than the non-acid treated.

The thus formed anion exchange sorber is particularly useful when placed in a Mab purification chromatography scheme. For example, cell culture fluid including monoclonal antibodies can be purified using affinity chromatography, such as a Protein A or Protein G affinity chromatography, followed by one or more cation exchange columns. The output from the final cation exchange column then can be flowed through the present anion exchange column for significantly reducing the concentration of residual host cell proteins, viruses, nucleic acids, endotoxins and other impurities in the fluid by causing these impurities to bind to the media under appropriate conditions while allowing useful, purified product to flow through the exchanger.

Importantly, further purification of the cation exchange pool (the output from the cation exchange column(s)) using the instant anion exchange sorber can be accomplished without the significant dilution of the cation exchange pool that was conventionally necessary in order to reduce the salt concentration (and lower conductivity) to enable the host cell proteins to effectively bind. Indeed, the sorbers of the present invention have very high binding capacity even at high salt concentrations and conductivity (e.g., >60 g/L BSA binding at 200 mM NaCl), and allow for much higher mass loading than conventional sorbers (e.g., 3 kg/L compared to 0.05 kg/L) under typical cation exchange pool conditions, see Example 7 below. The ability to reduce or eliminate dilution of the cation exchange pool due to the high capacity at high salt concentrations of the instant sorber is a significant advantage.

The present sorber also exhibits robust removal of viruses at relatively high salt concentration and relatively high pH (pH's of 7.6 and salt concentrations of 100 mM and 150 mM still resulted in acceptable removal of virus).

Those skilled in the art will also appreciate that for some applications, the downstream polishing carried out by the one or more cation exchange columns may not be necessary, and the instant anion exchange sorber can be placed downstream of the affinity column without intermediate cation exchange columns in between. Analogously, for some applications the instant anion exchange sorber can be placed downstream of the cation exchange column with no need for capture (affinity) column preceding it.

The following examples are included herein for the purpose of illustration and are not intended to limit the invention.

Example 1

PAA on Hydrophobic UPE

An aqueous solution was prepared containing 20 wt. % isopropanol, 9 wt. % PAH (molecular weight 15,000), 3 wt. % lithium hydroxide monohydrate, 2 wt. % Triton X-100, 0.5 wt. % PEG-DGE (molecular weight 526), and 0.2 wt. % polyvinyl alcohol (molecular weight 30,000, degree of hydrolysis 98%). A hydrophobic UPE membrane with pore size rating 0.65 µm was fully wetted with this solution, and excess liquid was nipped off. The membrane was dried at room temperature for 24 hours and rinsed with copious amounts of water and methanol and dried again. The membrane wets readily with water and has weight add-on of about 25%. An eight-layer Millex®-type syringe device was manufactured from this membrane that has a surface area of 3.5 cm² and column height 1 mm. The device has a flow rate of 4.3 CV/min/psi, BSA capacity 90 mg/ml, and strength of binding of 54 mS/cm.

Comparative Example 1

PAA-GTMAC on Hydrophobic UPE

The modified membrane from Example 1 was further modified by submerging in 50 wt. % of glycidyltrimethylammonium chloride (GTMAC) at pH 13 for 24 hours, rinsed with water and dried. An eight-layer Millex®-type syringe device was manufactured from this membrane that has a surface area of 3.5 cm². The device has a flow rate of 0.7 CV/min/psi, BSA capacity 80 mg/ml, and strength of binding of 19 mS/cm.

Comparative Example 2

Sulfamic Acid Treatment

The modified membrane from Example 1 was further modified by submerging in 0.5M solution of sulfamic acid in water for 10 minutes, rinsed with deionized water and dried. An eight-layer Millex®-type syringe device was manufactured from this membrane that has a surface area of 3.5 cm². The device has a flow rate of 4.3 CV/min/psi, BSA capacity 80 mg/ml, and strength of binding of 80 mS/cm.

Comparative Example 3

An aqueous solution was prepared containing 11.6 wt. % PAH (molecular weight 75,000), 18.6 wt. % 1.0N sodium hydroxide solution, 11.6% sodium chloride, 23.2% of 17% aqueous solution of epichlorohydrin-modified polyethylenemine. A hydrophobic UPE membrane with pore size rating 0.65 µm was prewet with methanol and directly contacted with the about solution for 5 minutes. The wet membrane was placed in a polyethylene film bag and the bag was placed in an oven at 85° C. for 7 minutes while being careful not to dry out the membrane to initiate the crosslinking reaction. The wet membrane was then removed from the bag and allowed to dry at room temperature. The dry membrane was then placed in an oven at 100° C. for four hours to complete the crosslinking reaction. The membrane was then thoroughly washed with water, methanol and hydrochloric acid (1.0 N) and allowed to dry at room temperature. The membrane did not wet with water. An eight-layer Millex®-type syringe device was manufactured from this membrane that has a surface area of 3.5 cm². The device has a flow rate of 0.5 CV/min/psi, BSA capacity 61 mg/ml, and strength of binding of 81 mS/cm.

Example 2

PAA on Hydrophilic UPE

An aqueous solution was prepared containing 10 wt. % PAA (molecular weight 15,000) and 0.5 wt. % PEG-DGE (molecular weight 526). A hydrophilic UPE membrane with pore size rating 0.65 µm was fully wetted with this solution, and excess liquid was nipped off. The membrane was dried at room temperature for 24 hours, rinsed with copious amounts of water and dried again. The eight-layer device has a flow rate of 4.3 CV/min/psi, BSA capacity 80 mg/ml, and strength of binding of 49 mS/cm.

Example 3

Polyvinyl Amine on Hydrophilic UPE

An aqueous solution was prepared containing 20 wt. % isopropanol, 7 wt. % polyvinyl amine (Lupamin 9095, BASF Corp., Mount Olive, N.J.) and 0.5 wt. % PEG-DGE (molecular weight 526). A hydrophilic UPE membrane with pore size rating 0.65 µm was fully wetted with this solution, and excess liquid was nipped off. The membrane was dried at room temperature for 24 hours and rinsed with copious amounts of water and methanol and dried again. An eight-layer device was manufactured from this membrane that has a surface area of 3.5 cm². The device has a flow rate of 3.1 CV/min/psi, BSA capacity 87 mg/ml, and strength of binding of 32 mS/cm.

Example 4

Polylysine on Hydrophobic UPE

An aqueous solution was prepared containing 20 wt. % isopropanol, 4 wt. % polylysine hydrobromide (molecular weight 30,000-50,000), 4 wt. % lithium hydroxide monohydrate, 1 wt. % Triton X-100, 0.25 wt. % PEG-DGE (molecular weight 526), and 0.1 wt. % polyvinyl alcohol (molecular weight 30,000, degree of hydrolysis 98%). A hydrophobic UPE membrane with pore size rating 0.65 µm was fully wetted with this solution, and excess liquid was nipped off. The membrane was dried at room temperature for 24 hours and rinsed with copious amounts of water and methanol and dried again. The membrane did not wet with water and had weight add-on about 9%. An eight-layer device was manufactured from this membrane that has a surface area of 3.5 cm². The device had a flow rate of 7.1 CV/min/psi, BSA capacity 34 mg/ml, and strength of binding of 32 mS/cm.

Example 5

PAA on Activated Sepharose Beads

Agarose chromatography beads were modified with PAA. 2 g of Epoxy Sepharose 6B (GE Healthcare) were suspended in 8 ml Milli-Q water, to which was added 10 ml of 10% solution of PAA (molecular weight 3,000). The pH was adjusted to 11 with sodium hydroxide. The beads were gently shaken for 24 hours, carefully rinsed with water and stored wet in refrigerator prior to use. A chromatography column was packed with modified beads (column height 5.5 cm, column volume 1.88 mL) and tested. It had BSA capacity 20.6 mg/ml and SB 83 mS/cm.

Comparative Example 4

PAA-GTMAC on Activated Sepharose Beads

PAA-modified agarose beads from Example 5 were further modified by reacting them with 2% solution of GTMAC at pH 11 overnight. The beads were carefully rinsed with water and stored wet in refrigerator prior to use. A chromatography column was packed with modified beads (column height 4.7 cm, column volume 1.61 mL) and tested. It had BSA capacity 87.3 mg/ml and SB 25.4 mS/cm.

Example 6

Membranes with immobilized PAA from Example 1 were sealed in 8-layer, syringe devices and tested for virus retention. The data in Table 2 below show the impact of increasing salt concentration on MMV and MuLV retention. As seen in the Table, the MMV data for the Pall Mustang membrane (strength of binding 20 mS/cm) show that the LRV drops with increasing conductivity, whereas for the membrane of the invention (i.e., high strength of binding), complete removal is observed, even at the elevated salt concentrations.

In addition, the HCP removal was significantly better for the PAA membranes as compared to the quaternary ammonium salt chemistry (PAA-GTMAC, manufactured according to Comparative Example 1), as seen in Table 3. For the data in Table 3, the control was Capto Q beads sold by GE Amersham, which has a medium strength of bonding (i.e., approximately 30 mS/cm). It should be noted that these LRV's were obtained without significant losses of product due to non-specific binding of the monoclonal antibodies to the functionalized membrane (i.e., the anion-exchange properties effectively repelled the product from the membrane surface).

TABLE 2

Virus removal (X-MuLV) as a function of Salt Concentration

| | X-MuLV LRC | |
|---|---|---|
| DEVICE | 50 mM Salt | 100 mM Salt |
| PAA | >3.9 | >3.7 |
| Pall | >3.9 | >3.7 |

Virus removal (MMV) as a function of Salt Concentration and pH

| | NaCl Concentration in 25 mM Tris buffer | | | | | |
|---|---|---|---|---|---|---|
| | 50 | | 100 | | 150 | |
| Device | pH 7.6 (7.2 mS/cm) | pH 7.1 (12.2 mS/cm) | pH 7.6 (12.1 mS/cm) | pH 7.1 (17.2 mS/cm) | pH 7.6 (17.0 mS/cm) | pH 8.1 (16.6 mS/cm) |
| PAA membrane sorber | >6.2 | >5.3 | >5.5 | >5.5 | >5.5 | >5.4 |
| Pall Mustang Q | >6.2 | 2.1 | 2.8 | 0.6 | 0.9 | 1.8 |

TABLE 3

HCP removal from three different Monoclonal Antibodies

| Product (Pro. A Pool) | Conductivity (mS/cm) | HCP Load (ng/ml) | Prototype (PAA from Example 1) Removal (@ 400 CV) | Capto Q Removal (@ 30 CV) | Quaternary ammonium Removal (@ 400 CV) |
|---|---|---|---|---|---|
| 4 g/L Mab 1 | 10.7 | 420 | 62% | 14% | 0% |
| 7 g/L Mab 2 | 9.7 | 1800 | 31% | 0% | 0% |
| 3.7 g/L Mab 3 | 22 | 200 | 85% | 30% | 0% |

Example 7

A 0.65 µm UPE membrane was coated with 9% PAA and 0.5% PEGDGE on the pilot coating machine. The membrane was extracted and dried at 85° C. in a convection oven for 10 minutes. One sample was left at 85° C. for 12 hrs and the other was stored at room temperature. The membranes were then treated with 5% sulfamic acid in 5% isopropyl alcohol to stabilize the coating. The permeability of the membranes was then measured using a flux tester. In this test, the time taken for 500 ml of water to pass through a membrane sample (cross sectional area 9.6 sq.cm.) under vacuum (27.0" Hg) is measured. The membrane lots listed in Table 1 were manufactured to demonstrate the improvement in permeability as a result of the curing step. As seen in Table 4, the "non-cured" membranes have significantly higher flow-time (indicating lower permeability) than the "cured" membranes.

As seen from Table 5, the curing step can be used to control the permeability and capacity of the membranes as desired. All the membranes had a BSA strength of binding between 60-75 mS.

TABLE 4

Comparison of flow times for cured and non-cured membranes

| Lot No | Curing conditions | Flux (s/500 ml) |
|---|---|---|
| 020307-60821 | — | 1180 |
| 020307-60821 | 85 C. 12 hr | 96 |
| 020307-60803 | — | 2650 |
| 020307-60803 | 85 C. 12 hr | 106 |

TABLE 5

Processing Conditions for Membrane Adsorber

| UPE Lot No | PAA Lot No. | Roll No | Cure temp (° C.) | Cure Time (hr) | Flow Time (hr) (s/500 ml) |
|---|---|---|---|---|---|
| UPDP 101006R9 | 60821 | 103A | 100 | 16 | 58 |
| UPDP 101006R9 | 60821 | 103B | 90 | 6 | 95 |
| UPDP 101006R6 | 60803 | 104 | 90 | 6 | 102 |
| UPDP 101106R5 | 60821 | 105 | 90 | 6 | 90 |
| UPDP 101106R5 | 60801 | 102 | 90 | 6 | 84 |
| UPDP 101006 | 60821 | 011507-1 | 90 | 12 | 80 |
| UPDP 101106R5 | 60821 | 011507-2 | 95 | 12 | 52 |

Example 8

0.65 μm UPE membrane rolls were coated with 9% PAA and 0.35% PEGDGE on the pilot coating machine. The membranes were extracted with water and methanol and dried on a hot air impingement dryer at 120° C. The rolls were then subjected to curing at varying temperatures and times as shown in the table below. The membranes were then treated with 5% sulfamic acid in 5% isopropyl alcohol to stabilize the coating. The permeability of the membranes was measured using a flux tester as described in the previous example.

As seen in the table below, flow-times on the order of 50 s can be obtained by heating the membrane to temperatures greater than 90° C. for 12 hours or longer. In case membranes with lower permeability (higher flow times on the order of 100 s) are desired, the temperature can be limited to below 85° C. and for shorter times (<10 h).

| | Cap, Flowtime (mg/ml, s) | | | | |
|---|---|---|---|---|---|
| | 8 hrs | 10 hrs | 12 hrs | 20 hrs | 24 hrs |
| 85° C. | 107.7, 147.6 | | 95, 63.9 | | 92.9, 88.0 |
| 90° C. | | 95, 41 | | 90, 39 | |
| 95° C. | 92.6, 79.2 | | 89.6, 50.2 | | 85.8, 67.1 |
| 100° C. | | 79, 39 | | 63, 41 | |

What is claimed is:

1. A method of purifying a biological sample comprising antibodies and impurities, said method comprising: purifying said biological sample by subjecting said sample to affinity chromatography; further purifying said sample by subsequently loading said sample on anion exchange media comprising a porous coated media comprising a porous substrate and a porous coating on a surface of said porous substrate, said coating comprising one or more crosslinked polymeric primary amines or copolymers thereof; and collecting the further purified sample.

2. A method of purifying a biological sample comprising antibodies and impurities, said method comprising: purifying said biological sample by subjecting said sample to cation exchange chromatography; further purifying said sample by subsequently loading said sample on anion exchange media comprising a porous coated media comprising a porous substrate and a porous coating on a surface of said porous substrate, said coating comprising one or more crosslinked polymeric primary amines or copolymers thereof; and collecting the further purified sample.

3. The method of claim 1, further comprising carrying out cation exchange after said affinity chromatography step and prior to loading said sample on said anion exchange media.

4. The method of claim 1, wherein said biological sample is a cell culture.

5. The method of claim 1, wherein said further purified sample is collected in the flow-through of said anion exchanger.

6. The method of claim 2, wherein said porous substrate comprises a non-woven material.

7. The method of claim 6, wherein said non-woven material is a mat or fabric.

* * * * *